United States Patent [19]

Bacon, Sr.

[11] Patent Number: 4,502,877

[45] Date of Patent: Mar. 5, 1985

[54] COMBINATION COUNTERFLOW HEAT EXCHANGER AND FRACTIONATING TOWER

[76] Inventor: Kenneth H. Bacon, Sr., 5398 E. 26th Pl., Tulsa, Okla. 74114

[21] Appl. No.: 502,742

[22] Filed: Jun. 9, 1983

[51] Int. Cl.³ .............................................. B01D 3/14
[52] U.S. Cl. ........................................ 62/42; 202/158
[58] Field of Search .................. 62/31, 34, 36, 38, 39, 62/41, 42, 43; 202/158, 235

[56] References Cited

U.S. PATENT DOCUMENTS 2,281,906  5/1942  Adams .................................... 62/34
3,390,534  7/1968  Bergo et al. ............................. 62/31

Primary Examiner—Frank Sever
Attorney, Agent, or Firm—Head, Johnson & Stevenson

[57] ABSTRACT

An improved system for separating higher boiling hydrocarbon products from methane in a gas/liquid extraction plant. The improvements lies in combining the fractionating tower with a counterflow plate and tube heat exchanger through which the refrigerated low pressure gas flows from top end to bottom end, and the precooled high pressure gas flows upwardly in counterflow relation. The heat exchanger is in the form of an annular chamber with tubes running the full length from bottom to top and plates forcing a zig-zag flow of the cold gas. This sets up a more or less linear temperature gradient which is impressed on the fractionating tower inside of the heat exchanger, which forms the inner wall of the heat exchanger and makes for more efficient and effective fractionation of the entering gas and vapor mixture.

5 Claims, 8 Drawing Figures

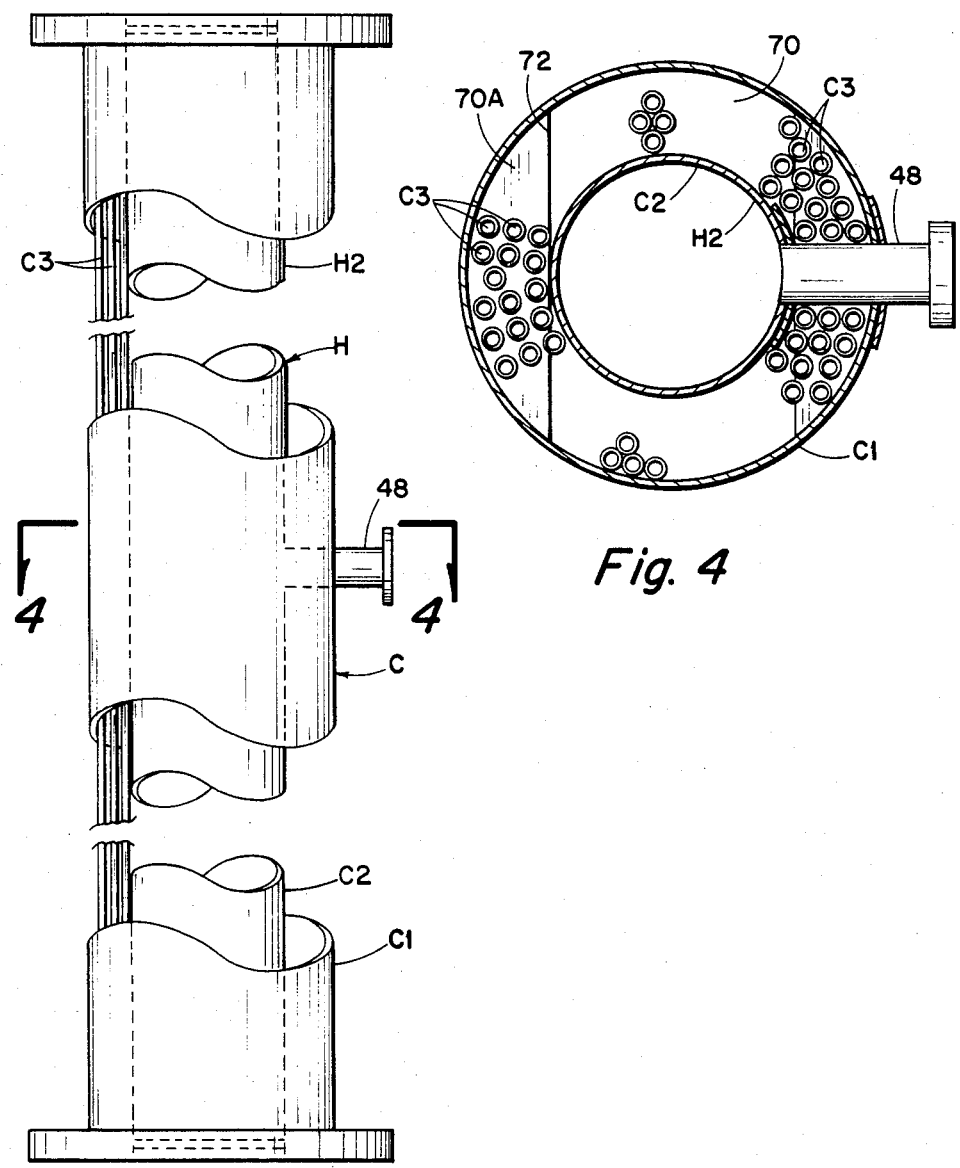

COMBINATION COUNTERFLOW HEAT EXCHANGER AND FRACTIONATING TOWER

BACKGROUND OF THE INVENTION

1. Field of the Invention

This invention lies in the field of apparatus for separation of liquid hydrocarbons from natural gas. More particularly, it concerns an improved design of an apparatus for use in a system based on conventional processing steps for removing condensable vapors from methane in a stream of natural gas.

2. Description of the Prior Art

The art of fractionating a hydrocarbon mixture produced from deep gas formations in the earth comprises some non-condensable gases such as methane and some condensable vapors such as ethane, propane, butane, etc. The object of the fractionation or processing of the natural gas is to remove the higher boiling components from the methane effectively and efficiently.

Many publications, textbooks and patents have been written covering the basic system of fractionating a gas mixture and such forms no part of this invention. Each of the processes involve a number of distinct steps requiring distinct pieces of processing equipment, such as gas liquid separators, compressors, expanders, heat transfer devices and fractionating columns. This invention does not change the basic processing system, but is combines two of the most important pieces of processing equipment so as to provide a more efficient and more effective separation of the methane from the higher boiling components.

CROSS REFERENCES TO RELATED PATENTS

This invention is related to my two U.S. Pat. Nos. 3,397,138 issued Aug. 13, 1968, entitled "Gas Separation Employing Wbrk Expansion of Feed and Fractionator Overhead", and U.S. Pat. No. 4,022,597 issued May 10, 1977, entitled "Separation of Liquid Hydrocarbons from Natural Gas". U.S. Pat. Nos. 3,397,138 and 4,022,597 are entered by reference into this application.

SUMMARY OF THE INVENTION

It is the primary object of this invention to provide an apparatus which is more thermally efficient and more effective in separating a larger fraction of the heavier higher boiling components from the methane in a stream of natural gas.

These and other objects are realized and the limitations of the prior art are overcome in this invention, by providing a combination apparatus which consists of a central cylindrical column for the fractionation of the gas/vapor mixture.

The art of fractionating mixtures of gases of different boiling points is very old in the field of chemistry and chemical engineering. By refrigerating the feed gas mixture to as low a temperature as desired, to separate the components, the mixture is fed into the top of the fractionating tower.

U.S. Pat. Nos. 3,397,138 and 4,022,597 have been entered as part of this disclosure since they go into great detail in describing the operation of conventional gas liquid separation systems. Thus, it will not be necessary in this disclosure to provide the full details of how such a system operates. However, it will be desirable to briefly cover the various pieces of equipment that are required and briefly explain how some of them operate.

In a conventional gas liquid separation system such as is used with natural gas mixtures, for example, the entering gas is usually at high pressure and high temperature. The first step is to cool the high pressure gas as much as possible to separate some of the highest boiling point components. The cooled gas then passes through a heat exchanger with cold low pressure gas formed in another part of the system, so that the gas is cooled part way to desired lowest temperature of the fractionating column.. The cold pipeline gas passes through a gas/liquid separator. The separated liquid is then expanded to a lower pressure. This causes a further cooling of the gas to the desired low temperature of the top of the fractionating column. At this point the low pressure gas and liquid are again separated. The gas goes overhead to a gas-to-gas heat exchanger where the cold output of the separator cools the entering high pressure gas, to as low a temperature as possible. The cooled natural gas then goes to the expander, as previously explained. The warmed effluent from the bottom of the heat exchanger goes to a compressor and to the sales gas outlet.

In the fractionating column, at the top, the temperature is of the order of −156° F., which is that of the gas coming from the expander. At the bottom of the heat exchanger the temperature may be of the order of 4° F. By the process of evaporation and condensation of vapors and liquids up and down the column, there will be a gradient of temperature from the coolest at the top to the warmest at the bottom. This gradient is not a uniform temperature gradient, but is a variable slope gradient, which is set up by the natural flow of liquids and gases.

I have found that if there can be impressed upon this column a truly linear temperature gradient, then the fractionation process can work more efficiently and provide a better separation of the condensable vapors from the methane.

The heat exchanger, takes the cold effluent from the expander at −156° F. and warms it up to about 4° F. By making the exchanger of a counterflow type, there can be a more or less uniform gradient of temperature. Therefore, by making the heat exchanger in the form of an annular chamber which surrounds the fractionating column, with a common wall, the linear temperature gradient set up by the heat exchanger will then be forced upon the fractionator column improved results in the separation of vapors and gases.

This combination construction is not just an aggregation, it is a working combination because the temperature gradient provided by the heat exchanger is necessary to provide the optimum operation of the fractionating column. By making them a single unit, that is, by making the inner wall of the heat exchanger the same piece of metal as the outer wall of the fractionating column, then the two effects are combined with the resulting improvement. Of course, at the same time, the space occupied by the two devices is much less than if they were separated. However, it is the interaction between the heat exchanger and the fractionating column that is the essence of this invention.

BRIEF DESCRIPTION OF THE DRAWINGS

These and other objects and advantages of this invention and a better understanding of the principles and details of the invention will be evident from the following description taken in conjunction with the appended drawings in which:

FIGS. 3 and 4 show two views of the combination heat exchanger and fractionating column.

DESCRIPTION OF THE PREFERRED EMBODIMENT

Figure 1:
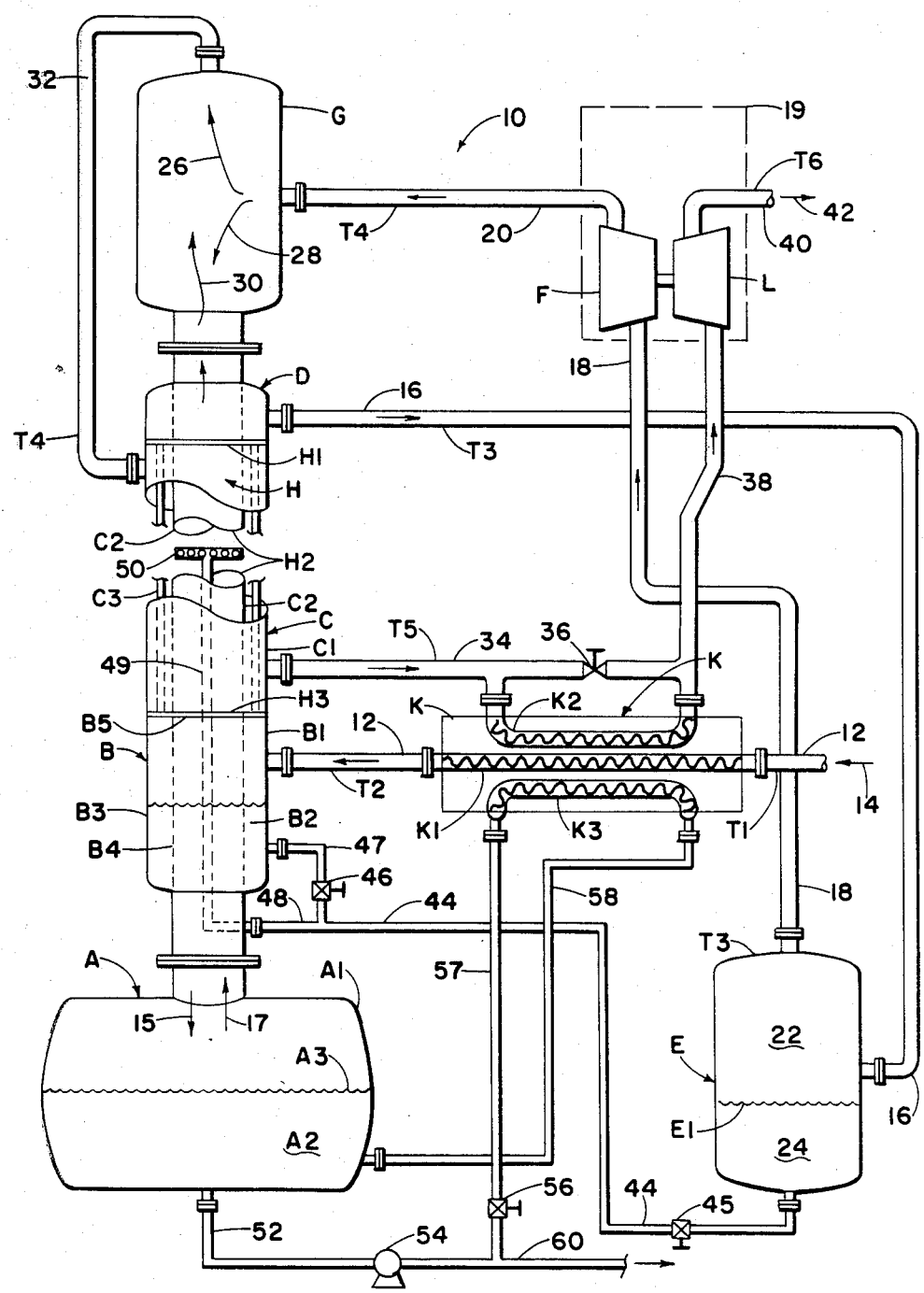
FIG. 1 shows schematically the complete separation system.

In the drawings are shown a number of separate pieces of processing equipment, such as A the reboiler, B the gas liquid separator, C the gas to gas heat exchanger, D the receiver for the cooled natural gas, E the second gas liquid separator, F the gas expander, G the reflux gas liquid separator, H the gas to gas heat exchanger, K the outlet gas heat exchanger and L is a compressor for the effluent gas from the system to the pipeline.

Briefly, the feed gas enters pipe 12 in accordance with arrow 14. The gas is at temperature T1, about 85° F. and goes to a heat exchanger K for inlet gas through pipe K1, where it is cooled from approximately 85° F. to a temperature T2 of the order of 14° F., and goes to the gas liquid separator B. Whatever heavy components are now condensed will accumulate in the bottom of the separator B. The warmed gaseous products of the entering feed to up through the heat exchanger C through a plurality of longitudinal tubes C3 to a receiver D, at the top of the heat exchanger. The gas is now cooled from the entering 14° to T3 at approximately −55° F. This cooling condenses other high boiling point components and the gas from the heat exchanger receiver goes over pipe 16 to a separator E, where again the gas and liquid are separated and the gas at a temperature of approximately T3, −55°, will go by pipe 18 to an expander F.

The gas output from the expander F will be in the neighborhood of T4, −156° which goes by pipe 20 to the reflux separator G, where it is further separated. The reflux separator G is mounted on top of the fractionating column H, which extends vertically from the reflux separator down to a reboiler A at the base. Over the major part of the fractionating column H is the plate and tubes, gas-to-gas heat exchanger C which is fed with cold gas at −156° from the top of the reflux separator G by pipe 32. This cold gas passing down through the annular heat exchanger C in a zig-zag fashion in accordance with the position of transfer plates (not shown but known in the art) which force the gas to flow downwardly in a zig-zag cross-wise fashion to provide a long path for effective heat transfer between the cold plates and the warm entering gas from B1 within the tubes. The cooled gas at −156° from pipe 32 is warmed up to T5, approximately 4° F. It then goes by pipe 34 through the heat exchanger K2 (which initially cooled the entering gas from 85° down to 14°) and this cold gas effluent at T5, 4° F. leaves the heat exchanger K at approximately 75° F. and goes to a compressor L of conventional design and out to the sales gas pipeline 40 at temperature T6, about 75° F.

There are three liquid/gas separators, the first one B for the entering cooled feed gas, the second one E for the cold entering gas from pipe 16, and the third one G, the reflux separator operating on the gas that has been cooled to the lowest temperature in the system at the outlet of the expander F.

So far, only the gas portion of the system has been discussed. There is liquid in the bottom of each of the three separators. In the case of the first separator B, the liquid at the bottom B2 is controlled by level control means and as the level builds up, liquid from B2 from the bottom part of the separator B, flows out by pipe 47 through a control means 46 to maintain liquid level. While all the control means are shown as manual, the art is well developed on the controlling of these flows by means of liquid level controllers or temperature controllers or flow controllers. Since these specific controllers do not form any part of this invention, and because they are old in the art they will not be described further.

Liquid from the bottom B2 of the separator B passes through pipe 47, control 46 and pipe 48, up through the center of the fractionating column pipe 49 where it is sprayed out against the outer wall of the column. Depending upon the temperature gradient of those walls, some of it will move up as gas in accordance with arrow 30 and some of it will move down as liquid 15 into the reboiler A. The downgoing liquid 15 and the upgoing vapor 17 are shown by the arrows. Since the separators B and E are connected into the high pressure gas portion of the system which includes pipe 12, 16 and 18, there will be high gas pressure on the liquid 24 of the separator E and it will be forced out through the bottom through flow control 45 and through pipe 44 which joins with the pipe 48 to feed liquid to the middle of the fractionating column H.

The reboiler A is connected to the bottom end of the fractionating column H, and also has a gas/liquid separation, with gas above the level A3, in the top A1, and liquid in the bottom A2. The level of the contact surface A3 being maintained by controlling the output flow of liquid. The liquid flows out through the bottom pipe 52 and to a pump 54. Since the interior of the fractionating tower is at low pressure, there is not sufficient pressure to force liquid from the reboiler and a pump 54 is required to force it out through pipe 60 to the liquid product output line. There is also a recycle through the control 56 and pipe 57 through portion K3 of the heat exchanger K and back into the reboiler drum through pipe 58.

The entering gas through pipe 12 enters at the temperature T1, which may be in the neighborhood of 85° and at a pressure of approximately 850 psi. It passes through the heat exchanger K as line K1 and is cooled by the flow of cooled gas from the heat exchanger through the portion K2 of the heat exchanger. Thus, the natural gas after passing through the first heat exchanger will be at temperature T2 of approximately 14° F. where it goes to the separator B. The separator is an annular shaped chamber with outer wall B3 and inner wall B4. The inner wall B4 is of the same diameter as the outer wall of the fractionating column. The high pressure gas in B1 is controlled by the liquid level on the bottom, and the heat transfer plate B5 and H3, which form a common wall. The tubes C3 of the heat exchanger are sealed through the wall H3 and B5 so that the cooled gas now at high pressure moves up through the tubes C3 to the receiver D where the cooled high pressure gas flows by line 16 at temperature T3 of about −55° F. to the separator E. The gas 22 then going by line 18 to the expander F where it is cooled down to the temperature T4 of approximately −156° F. There will be further condensation of the vapors which will separate out as the low pressure gas mixture flows to the reflux separator G. The uncondensable gas goes by arrow 26 overhead and the liquid 28 falls back into the fractionating column. Other cooled gas 30 flows with the gas 26 and out through pipe 32 at temperature T4 into the top of the heat exchanger C.

It will be clear from the drawing that the heat exchanger C is comprised of two pipes of different diameters. An outer pipe C1 and an inner pipe C2 with the annular space in between filled with longitudinal pipes C3 for gas flow upward as well known in the art and shown briefly in FIG. 4 there will be horizontal plates at selected spacings. These will be annular plates with segments cut off at one side. The discs will be positioned so that alternate discs have the cut away segmental portion on opposite sides of the heat exchanger. Thus, the gas moving down from the top must travel down through one opening in a plate and across to the other side of the exchanger in order to drop down to the next level of the plates and so on. This provides a lengthy flow path with opportunity for greater heat transfer. The counterflow principle provides for an efficient heat transfer and provides for a more or less linear thermal gradient from the entrance point of the cold gas to the exit point of the warmed cold gas.

The outlets for the low pressure gas is by pipe 34 at a temperature of approximately T5 of 4° F. This is controlled by a valve 36 through K2 to cause a fractional flow in a bypass around the valve, where it cools the entering gas in the pipe 12. The outlet gas then goes by pipe 38 to a rotary compressor L which is driven by the rotary expander, and then compressed gas at temperature T6 of about 75°, and line pressure, will go in accordance with arrow 42 through pipe 40 the sales outlet.

The third portion of the heat exchanger K is less critical to the process, but can provide some control of temperature of the liquid in the bottom of the reboiler. The pressurized liquid from the pump 54 will go through the control valve 56 by pipe 57 through the coils K3 and back by pipe 58 to the liquid portion A2 of the reboiler. The level is maintained at A3 by conventional means not shown, but well understood.

To review, the invention is centered in the operative combination of the coventional fractionation column H with reboiler A on the bottom and reflux separator G at the top with an annular type counterflow gas to gas heat exchanger, in which the cold gas from the separator is used to cool the entering high pressure natural gas in a counterflow plate and tube type heat exchanger, built in the form of an annular chamber with its inner wall the same as the outer wall of the fractionating column. This effectively impresses on the fractionating column a linear temperature gradient which more effectively and efficiently separates the heavier higher boiling components from the methane of the natural gas.

The preceding description in terms of FIG. 1 gives a complete and accurate picture of the chemical and chemical engineering factors involved in this invention. FIGS. 2 to 8 represent, in apparatus form, the general type of equipment that is necessary to carry out the chemical engineering operation shown in FIG. 1.

Referring now to FIGS. 2 to 8, FIG. 2 shows in mechanical apparatus forms substantially a duplicate of FIG. 1. The principal piece of equipment is the combination of reboiler A, separator B, gas-to-gas heat exchanger C, receiver D, gas/liquid separator E, expander F, reflux separator G, fractionating column H, and plate/fin heat exchanger is not shown separate as in FIG. 1, but is included in the housing A which combines the preheat exchanger K with the gas/liquid separator A.

Figure 2:
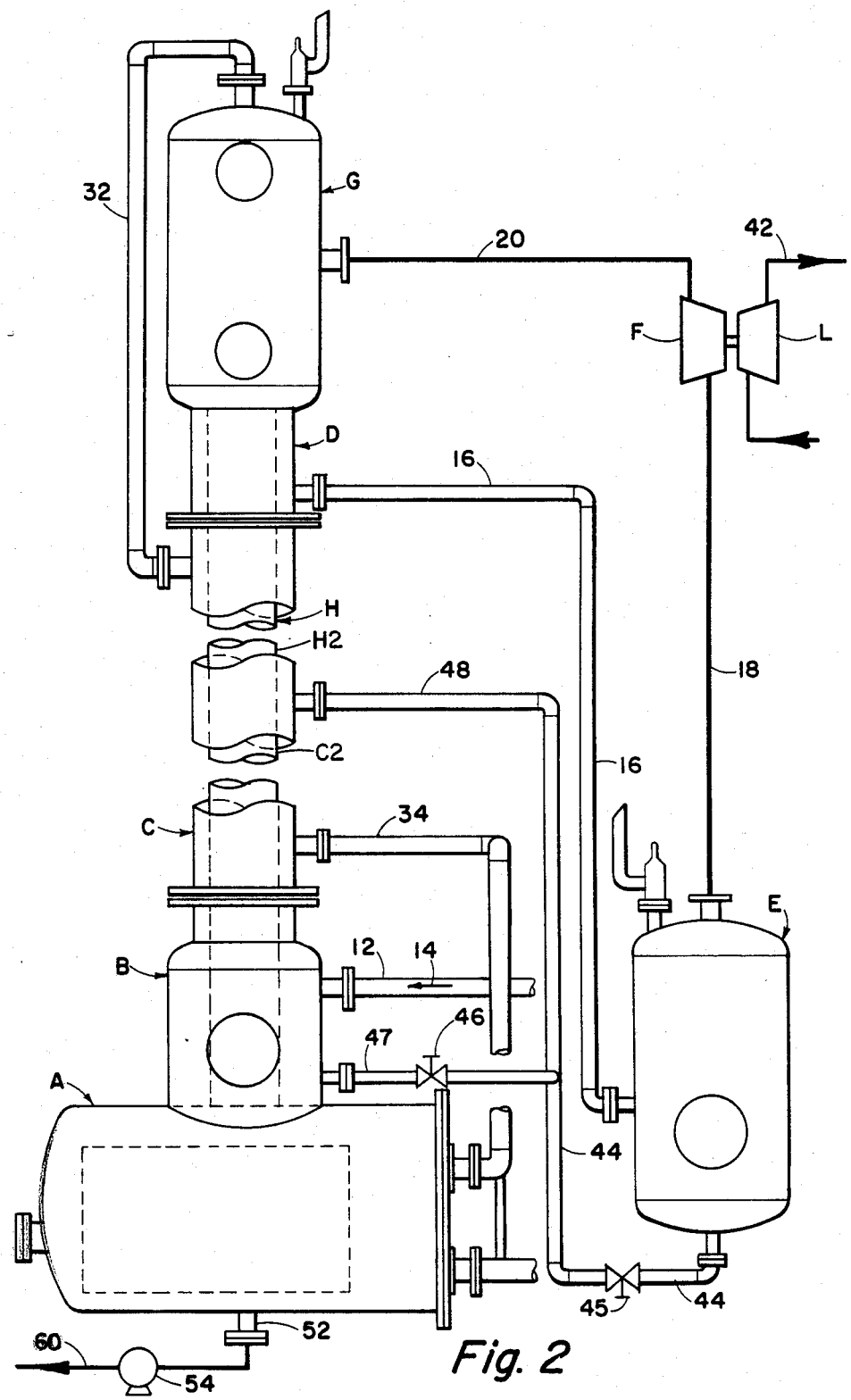
FIG. 2 shows a view of the assembly of major pieces of equipment for carrying out the operation as in FIG. 1.

While FIG. 1 is a precise schematic drawing of the complete system, because of the difficulty of showing views of all pieces of equipment, FIG. 2 is not as complete in the mechanical form as is FIG. 1 in the chemical engineering form. However, where practical, corresponding parts are given the same designation. FIG. 2 very clearly illustrates the general nature of the physical apparatus which, of course, can be inferred from FIG. 1, but leads directly to the final physical form of the apparatus which is sketched, though incompletely in FIGS. 7 and 8.

FIGS. 3 and 4 illustrate in partial section the construction of the combination fractionating column H and the heat exchanger C. FIGS. 3 and 4 illustrate, for example, that the return connection 48 from the bottom of the separator E to the middle of the fractionating column H enters through the sidewall of the heat exchanger into the fractionating column. FIG. 1 on the other hand shows it entering below the heat exchanger and passing axially up into the middle of the fractionating column. Either type of construction would be satisfactory.

FIG. 4 is a view across the plane 4—4 of FIG. 3 and clearly shows the pipe 48 that carries the liquid from separator E into the inner cylindrical space, inside of the wall C2, which is the interior wall of the heat exchanger. This wall is also the exterior wall of the fractionating column H2 as has been explained, to provide the most effective fractionating column H. FIG. 4 also shows the large number of vertical pipes C3 which almost fill the annular space between the heat exchanger, outer wall and the heat exchanger inner wall. Numerals 70 and 72 show one of the transverse plates which are annular in shape with a segment cut off along the line 72. Numeral 70A shows through that segmental clear space, the next lower plate 70A. Although not shown, 70A has its segmental opening on the opposite side of the axis, so that the gas flowing in along pipe 32 into the top of the heat exchanger will have to travel back and forth from the right side to the left side, and right side, and so forth, on down between the plates, passing the multitude of pipes C3, until at the bottom the cooled gas leaves by pipe 34 to be compressed in the compressor L and delivered to the line.

Figure 6:
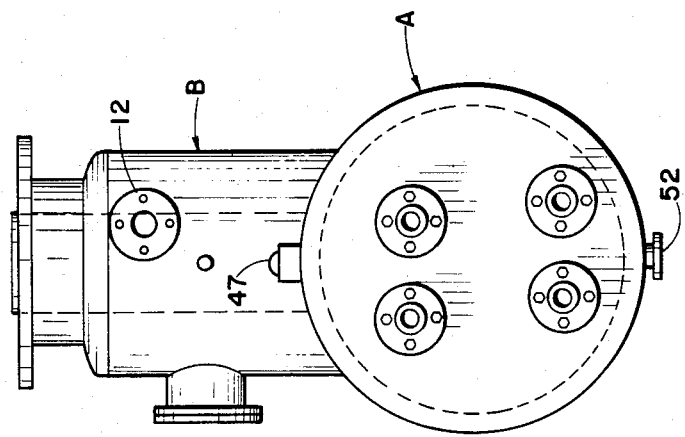
FIGS. 5 and 6 show two views of the combination reboiler, platefin heat exchanger, and high pressure entering gas separator.
Figure 5:
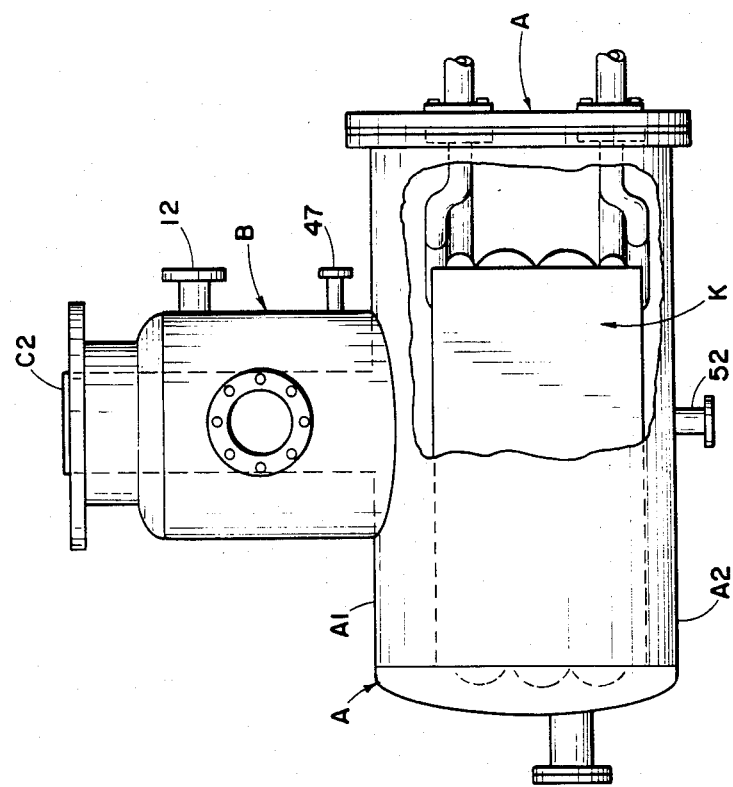

FIGS. 5 and 6 show in two views, the construction of the combination of the separator B, reboiler A, and the heat exchanger K. Unfortunately, it is difficult to show on a two dimensional drawing exactly what is happening, and for that reason, the schematic diagram FIG. 1 was drawn with the two parts separated, so that a very clear idea can be had of the actual transport means for the various gas/ liquid components. The upper part of FIGS. 5 and 6 is the separator B with the top connection 12 and the bottom connection 47.

Figures 7, 8:
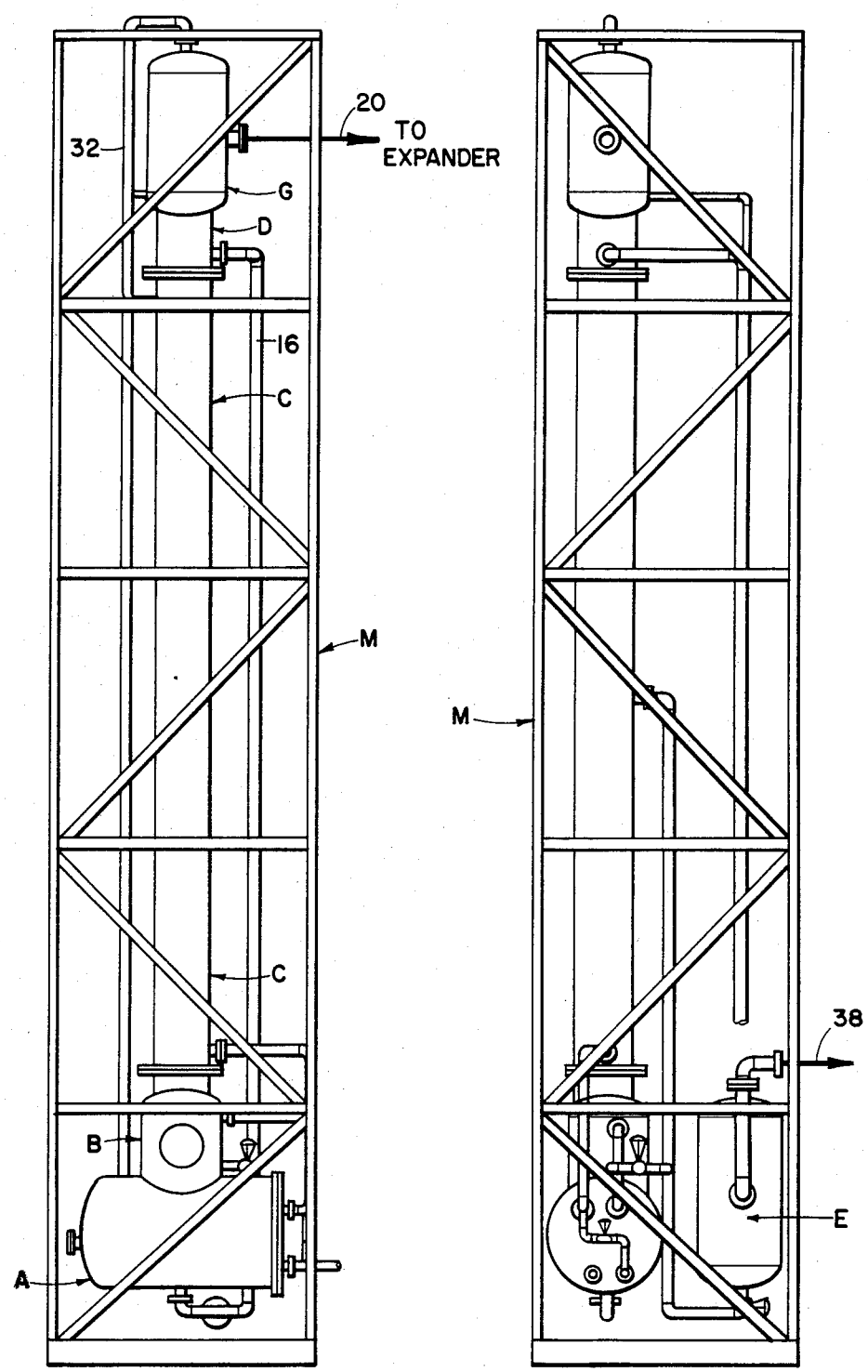
FIGS. 7 and 8 show two partial views of the finished assembly of the system of FIG. 1.

Finally, FIGS. 7 and 8 show how the equipment is assembled into a framework M which is tall, and of substantially rectangular cross-section. The base area is sufficiently large so that the unit is perfectly stable, while the transverse dimensions are such that when loaded in a horizontal position on a conventional truck trailer, it will be of such low outline that it can be transported on all of the public roads.

FIG. 2 shows, as does FIG. 1, the expander F and compressor L are mounted on the same shaft. This is the most efficient system, since in cooling the expanding gas, a lower temperature can be reached, if work is done by the gas expansion (such as for example) by recompression of the warmed expanded gas in the compressor L.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In a system for separating higher boiling hydrocarbon products from methane in a gas liquid extraction plant, said plant having at least heat exchanger means (HEM) and fractionating tower means (FTM), the improved construction of a combined fractionater/heat exchanger means for more completely and efficiently separating the methane from higher boiling components, comprising:
   (a) said fractionating tower means having a cylindrical outer wall with vertical axis, and means to impress on its outer wall a linearly varying temperature, or uniform temperature gradient, from top to bottom;
   (b) said means to impress said uniform temperature gradient comprising counterflow heat exchanger means (HEM) constructed in the form of an annular chamber, with the inner wall of said HEM being the same tube as the outer wall of said FTM;
   said HEM being designed to provide said uniform temperature gradient produced therein and applied in the inner wall thereof, which becomes the source of the uniform temperature gradient in the FTM; and this combination of FTM and HEM provides as a single monolithic structure, the temperature control necessary to produce the efficient gas separation desired.

2. The system as in claim 1 in which said HEM is a plate and tube counterflow heat exchanger means.

3. The system as in claim 1 including gas expander means connected at its inlet to the top of a high pressure gas/liquid separator, and from its outlet to said G/LS.

4. Apparatus for controlling the temperature gradient along the outer shell of a fractionating tower means (FTM) comprising:
   counterflow heat exchanger means (HEM) constructed in the shape of an annular chamber surrounding said FTM and in which the outer wall of said FTM forms the inner wall of said HEM;
   said HEM being designed to provide a linear temperature variation along the inner wall of said HEM, and through said common outer wall of said FTM to said FTM.

5. Apparatus as in claim 4 and including means to supply a high temperature fluid to the top of said HEM and to supply a low temperature fluid to the bottom of said HEM;
   whereby the counterflow of these two fluids will provide the desired temperature gradient along the inner wall of the HEM.

* * * * *